Dec. 2, 1941. D. BUCCICONE 2,264,433
THICKNESS GAUGE
Filed Feb. 11, 1941 3 Sheets-Sheet 2
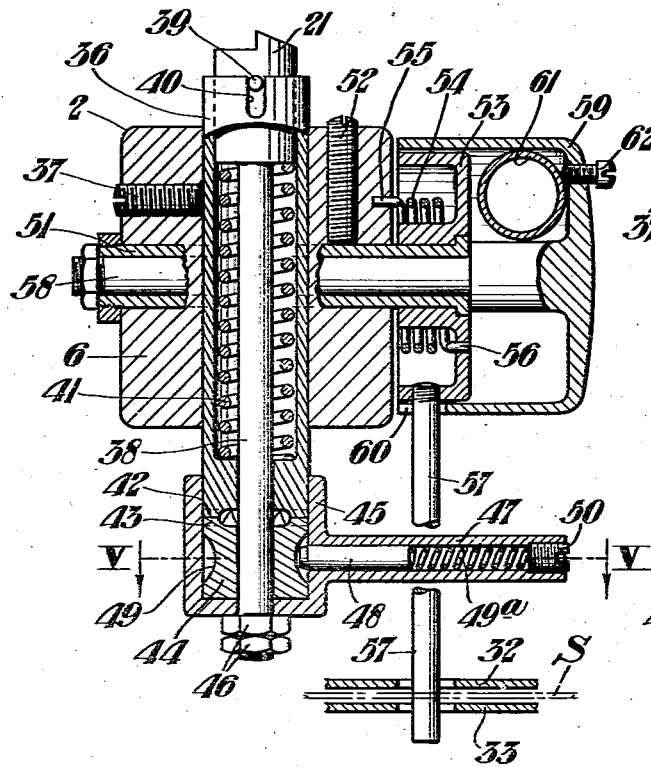

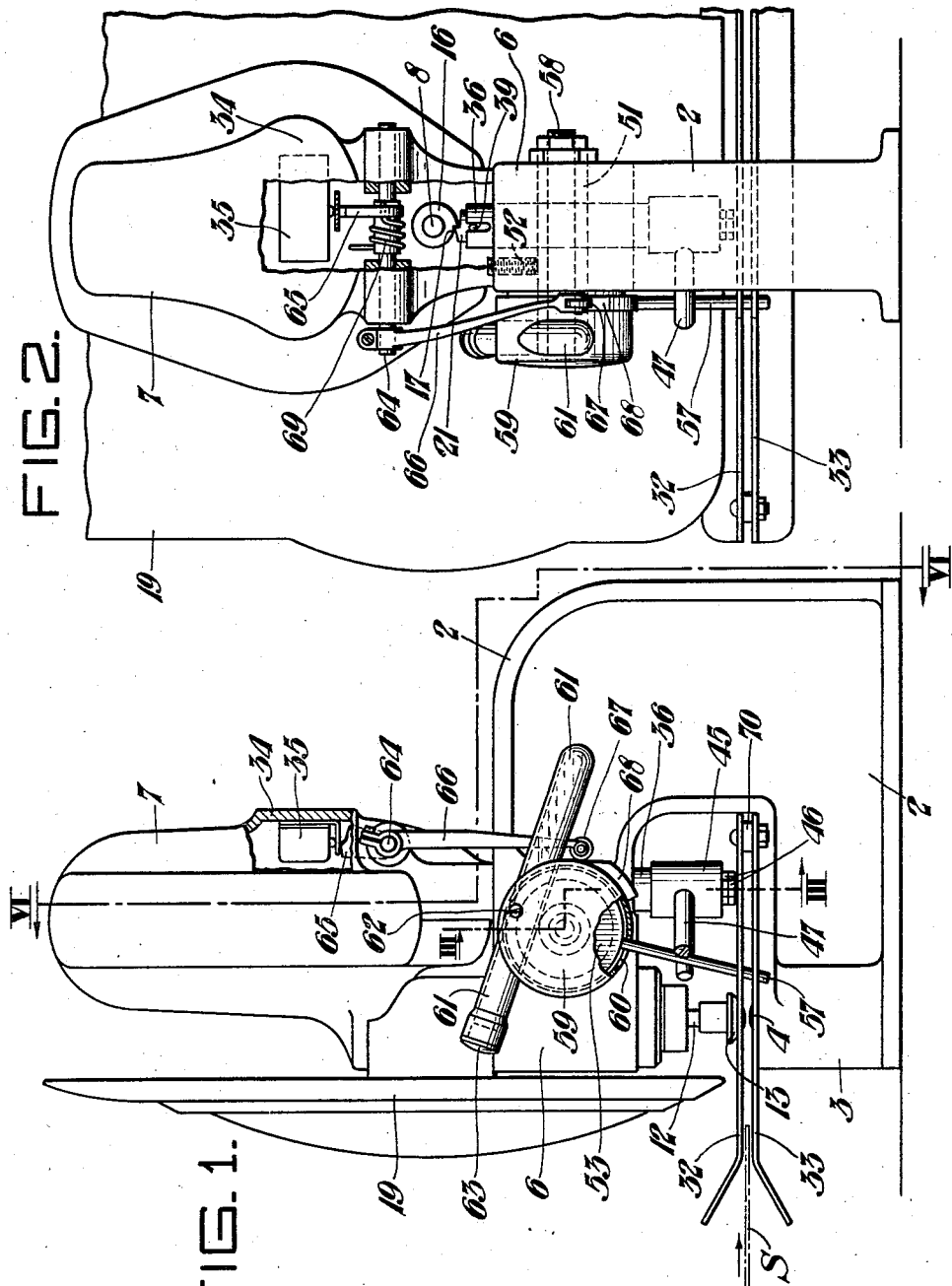

Dec. 2, 1941.  D. BUCCICONE  2,264,433
THICKNESS GAUGE
Filed Feb. 11, 1941  3 Sheets-Sheet 3
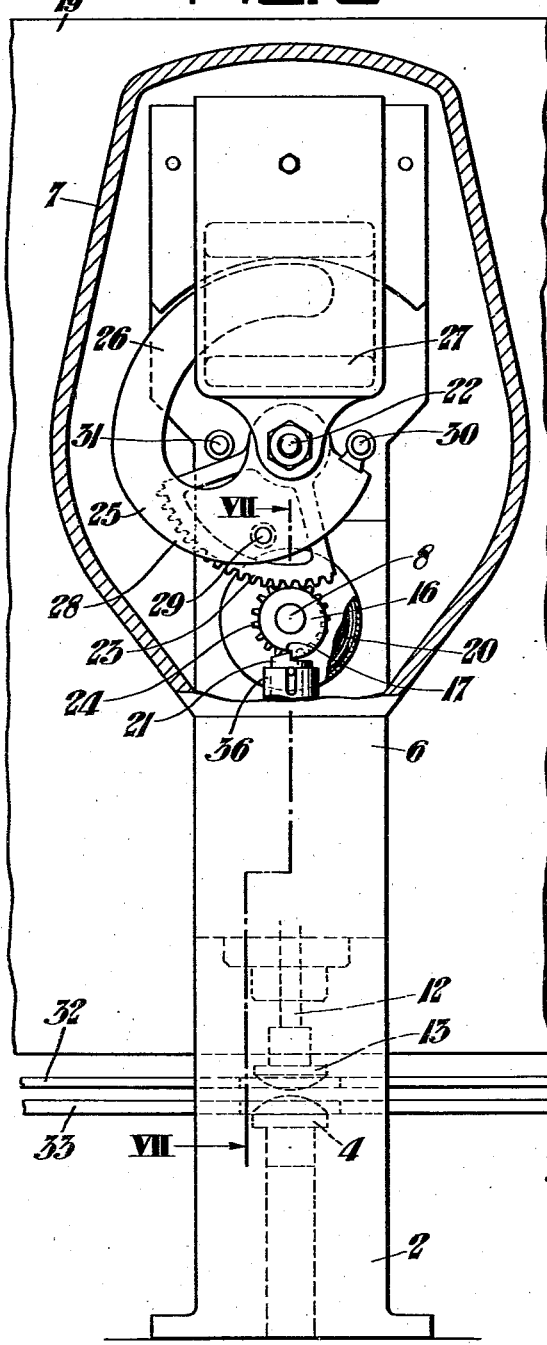
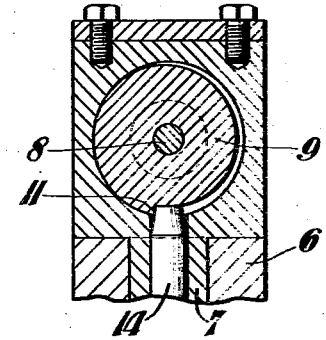
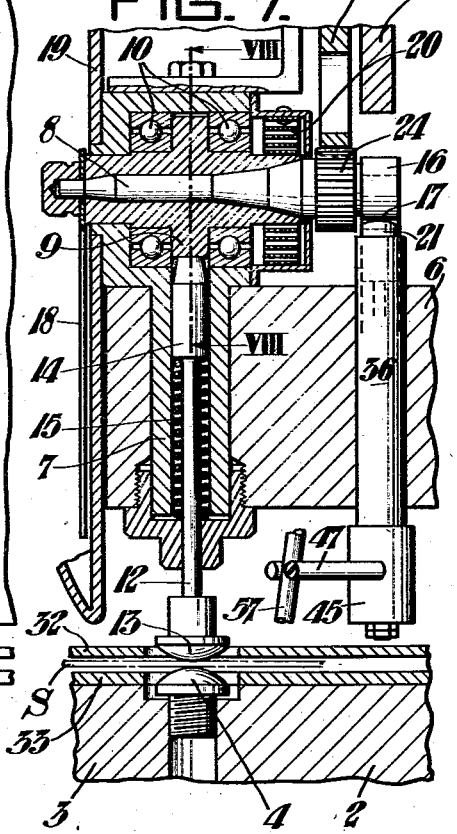
Inventor:
DARIO BUCCICONE,
by John E. Jackson
his Attorney.

Patented Dec. 2, 1941

2,264,433

UNITED STATES PATENT OFFICE 2,264,433

THICKNESS GAUGE

Dario Buccicone, Gary, Ind.

Application February 11, 1941, Serial No. 378,453

6 Claims. (Cl. 33—147)

This invention relates to gauges and, particularly, to an improved automatic gauge for determining the thickness of metallic sheets and the like.

The present invention is an improvement of the thickness gauge shown and described in my Patent No. 2,219,622 which issued October 29, 1940.

It is the general object of the present invention to provide an improved thickness gauge for determining the thickness of metallic material and the like which is automatically placed in operation and controlled by the material to be gauged, and having an improved mechanism incorporated therewith for automatically resetting the gauge after each gauging operation so as to be in readiness for the next gauging operation.

It is another object of the invention to provide an improved thickness gauge which is simple and inexpensive in its construction and use and, at the same time, one that accurately and efficiently gauges the material.

Various other objects and advantages of this invention will become more apparent in the course of the following specification and will be particularly pointed out in the appended claims.

In the accompanying drawings there is shown, for the purpose of installation, as embodiment thereof which my invention may assume in practice.

In the drawings:

Figure 1 is a side elevation partly in section of the gauge showing the improvements of my invention incorporated therewith;

Figure 2 is a rear elevation of the same, partly in section;

Figure 3 is a section taken on the line III—III of Figure 1;

Figure 4 is an elevation of the sleeve and ratchet member assembly as shown in Figure 3;

Figure 5 is a section taken on the line V—V of Figure 3;

Figure 6 is a section taken on the line VI—VI of Figure 1;

Figure 7 is a section taken on the line VII—VII of Figure 6; and

Figure 8 is a section taken on the line VIII—VIII of Figure 7.

As has been hereinbefore stated, the present invention is an improvement of the thickness gauge shown in my Patent No. 2,219,622, and the parts thereof relating to the present invention will be briefly described herein.

Referring particularly to Figures 6, 7 and 8 of the drawings, the gauge shown in the above mentioned patent and with which my improvements are incorporated, comprises a yoke-shaped frame 2 having a base or lower arm 3 in which there is arranged a lower or preferably stationary anvil 4. There is suitably mounted on the outer end of the upper arm 6 of the frame 2, a housing 7 having a cam shaft 8 horizontally disposed therein with a cam member 9 arranged thereon and secured thereto, both of which are rotatably mounted on suitable bearings 10 positioned in the upper portion of the housing 7. The cam member 9 has arranged, on the periphery thereof, preferably a shoulder or stop portion 11.

In the lower part of the housing 7, there is arranged a plunger 12 having an upper anvil 13 arranged on the outer lower end thereof oppositely disposed from the anvil 4 and a cam follower 14 on the upper end thereof which is adapted to contact the cam 9 and against which the shoulder or stop 11 is adapted to be normally positioned, as is clearly shown in Figure 8 of the drawings. There is positioned preferably around the plunger 12, between the cam follower 14 and the lower inner end wall of the housing 7, a compression coil spring 15 which is adapted to keep the cam follower of the plunger 12 against the cam 9 at all times.

On the inner end of the cam shaft 8 there is securely mounted an annular member 16 having a flange or notched portion 17, or other suitable catch arrangement, arranged on the periphery thereof. On the other end of the cam shaft 8 there is arranged a pointer 18 in front of an enlarged graduated indicating dial 19 which is suitably mounted preferably on the outer face of the housing 7 and with which the pointer 18 is adapted to cooperate to indicate thereon the thickness of the material gauged. There is located adjacent the inner end of the housing 7 and around the cam shaft 8 to which one end thereof is securely attached, a helical spring 20. This spring is normally loaded and it is the purpose of this spring to rotate the cam shaft 8, together with the cam 9 carried thereby when the trigger or latch-like member 21 is moved out of engagement with the annular member 16 in a manner which will hereinafter be described, so that the cam 9 will move to force the plunger 12 outwardly toward the lower anvil 4 to position the upper anvil 13 against the material to be gauged.

There is suitably arranged on the upper part of the housing 7 above the shaft 8 a stud shaft 22 having a gear segment 23 loosely pivoted thereon which is adapted to mesh with a pinion gear 24 securely arranged on the cam shaft 8. There is also pivotally mounted on the stud shaft 22 an arcuate-shaped rocking member 25 having a solenoid armature portion 26 arranged integrally therewith which is adapted to cooperate with a solenoid 27 suitably arranged adjacent the top of the housing 7 above the stud shaft 22. The rocking member 25 has preferably a weighted bottom portion 28 which is adapted to act as a counterbalance for the solenoid armature portion 26 and has arranged thereon an inwardly extending pin 29, preferably rubber covered, which is adapted to extend into an opening between the arms of the gear segment 23 and cooperate therewith to actuate the same, as will be described later in the specification. There is also arranged adjacent the stud shaft 22 and to one side thereof, a stop member or pin 30 against which the rocking member 25 is adapted to normally rest, and a stop pin 31 on the opposite side of the stud shaft against which the gear segment 23 is adapted to normally rest, as shown in Figure 6, both of which are preferably rubber covered so as to absorb any shock to these parts and to the gauging device.

There is suitably mounted, preferably on the base or lower arm 3, spaced apart guide members 32 and 33. These guide members preferably have outwardly flared ends which, of course, aid in properly guiding the material to be gauged therebetween. There is mounted preferably in a suitable housing portion 34 preferably on the back side of the housing 7, a limit switch 35 which is adapted to control the energization of the solenoid 27.

According to the present invention as shown in Figures 3, 4 and 5 of the drawings, there is arranged in the upper arm 6 of the frame 2 at a point directly below the annular member 16 and the shaft 6, a vertically disposed sleeve-like housing member 36 which is securely held in position therein preferably by means of a set screw 37. There is disposed in the sleeve-like member a plunger-like member 38 upon the upper end of which the trigger or latch-like member 21 is disposed. There is carried by the latch member 21 at either side thereof preferably an outwardly extending pin 39 which is adapted to cooperate with respective slots 40 arranged in the upper end of the sleeve 36 so as to prevent the plunger, together with the trigger, from rotating relative to the sleeve 36. There is also disposed in the sleeve or housing 36 around the plunger 38 therein, a tension coil spring 41 which is adapted to normally maintain the plunger 38, together with the latch member 21 carried thereby, in its uppermost position in engagement with the notch 17 carried by the annular member 16, as shown in Figures 6, 7 and 8. The extreme lower end of the sleeve 36 has preferably a serrated or saw-tooth-shaped end portion 42 which is adapted to cooperate with a corresponding serrated or saw-tooth-like portion 43 arranged on the upper side of a ratchet-like member 44 which is loosely disposed for rotation on the lower end of the plunger 38 in abutting relation to the lower end of the sleeve 36. The two serrated faces 42 and 43 are normally in notched relation as shown in Figure 4, and maintained in such relation by means of the tension of spring 41 with the clamping action of the nuts 46.

There is positioned around the ratchet 44 and the lower end of the sleeve 36 a sleeve-like casing member 45 which is held in position by means of lock nuts 46 arranged on the lower end of the plunger 38. There is integrally arranged with the casing member 45 a horizontally outwardly extending forked or U-shaped portion 47. There is arranged in one leg of the U-shaped member a pawl 48 which is adapted to cooperate with indentations or teeth 49 arranged around the periphery of the ratchet member 44. The pawl 48 is maintained in yieldable engagement with the teeth or indentations of the ratchet 44 by means of a spring 49ᵃ arranged in the leg of the forked member in back of the pawl and retained in position therein by means of a set screw 50.

There is also arranged in the upper arm 6 of the frame 2 at a point below the housing 7 and preferably forwardly of the sleeve-like member 36 and the plunger 38 arranged therewith, a horizontally disposed sleeve-like member 51 which is held securely in position therein preferably by means of a set screw 52. There is disposed on the outer end of the sleeve-like member 51 for limited oscillating movement relative thereto, a cylindrically shaped housing member 53 in which there is disposed a helical torsion spring 54 having one end thereof secured to arm 6 as at 55 and with the opposite end thereof secured to the housing 53 as at 56. There is carried by the housing 53 a downwardly extending stud-like lever member 57 which extends downwardly through the legs of the forked or U-shaped member 47 and down through both the upper and lower guide plates or members 32 and 33 to a point therebelow so as to be positioned directly in the path of the sheet S to be gauged when the same is positioned in the gauge.

There is arranged through and journaled in the sleeve-like member 51 a shaft 58 for limited oscillating movement relative thereto, and with which there is arranged on the outer end thereof a cylindrical housing member 59 which is adapted to fit over and around the housing member 53, as shown in Figure 3 of the drawings. The lower inner side of the housing 59 is cut away as at 60 so as to provide a slot in the periphery thereof in which the lever 57 is adapted to be disposed. There is carried by the housing member 59 a longitudinally extending tube-like container 61 which is adapted to be adjusted and locked in any desired position, preferably by means of a set screw 62. There is disposed in the tube-like member 61 a small quantity of balancing medium, preferably mercury, which is introduced through the open end thereof which is afterwards closed by the plug or cap 63. It will be understood that the balancing medium may be of any suitable material, either solid or liquid in nature, and not confined or limited necessarily to mercury and only sufficient in quantity to unbalance the container 61 as will be later described.

There is arranged on the housing 7 at a point directly below the limit switch 35 a horizontally disposed shaft 64 which is suitably journaled therein. There is securely mounted on the shaft 64 a cam-like switch actuating member 65 which is adapted to control the actuation of the limit switch 35 arranged thereabove. There is securely arranged on the outer end of the shaft 64 a downwardly extending lever arm 66 preferably having a roller 67 rotatably arranged in the lowermost end thereof which is adapted to cooperate with an outwardly projecting cam-like portion 68 arranged on the periphery of the housing member 59, as is clearly shown in Figures 1 and 2 of the drawings. There is also arranged with the shaft 64 a spring 69 which is adapted to maintain the roller 67 at all times in engagement with the periphery of the housing 59.

The improved gauge of my invention operates in the following manner:

It will be understood that the plunger 12, together with the anvil 13 carried thereby, is normally held in a retractable position so that the upper movable anvil 13 is spaced from the lower stationary anvil 4. The metallic sheet or material to be gauged is inserted between the guide plates 32 and 33 and moved into the gauge until the back edge of the sheet contacts the downwardly extending lever 57 and moves the same rearwardly until the sheet contacts the stop member 70. The movement of the lever 57 in turn moves the U-shaped or forked portion 47 of the sleeve-like casing member 45 rearwardly, thereby rotating the same which in turn rotates the ratchet member 44 due to the action of the pawl 48 about the plunger 38, whereby the teeth 42 carried by the lower end of the sleeve 36 and the teeth 43 carried by the ratchet member 44 are caused to ride over each other, thereby forcing the plunger 38 downwardly together with the trigger or latch member 21 carried thereby against the action of the coil spring 41. This downward movement of the latch member 21 causes the same to be disengaged from the annular member 16 arranged on the cam shaft 8, thereby permitting the same to be rotated due to the action of the loaded helical spring 20 in such a manner that the cam 9 acts against the cam follower 14 on the end of the plunger 12 so as to force the plunger, together with the upper anvil 13 carried thereby, downwardly against the action of the coil spring 15 and positioning the anvil 13 against the top surface of the material being gauged. As the cam shaft 8 rotates, the pinion gear 24 carried thereby causes the gear segment 23 also to rotate about the shaft 22, thus positioning it against the stop 30. The movement of the cam shaft 8, of course, also moves the pointer 18 carried thereby and when the anvil 13 comes to rest against the top of the sheet, the pointer is positioned opposite the calibration on the indicating dial 19 which indicates the thickness of the material.

It will be seen that as the lever arm 57 is moved rearwardly by the sheet being positioned in the gauge, the lever arm also rotates the housing member 53 to which it is attached against the action of the helical torsion spring 54, thereby tending to load the same. The rearward movement of the lever arm 57 also rotates the shaft 58 together with the housing member 59 and tube-like container 61 carried thereby. It will be understood that after the lever 57 has reached its most rearward position and the sheet has abutted against the stop 70, the tube-like container 61, due to the rotation of the housing 59, reaches a position slightly out of parallel or the horizontal, with the end maintaining the balancing medium higher than the opposite end thereof. This condition causes the balancing medium to move or flow downwardly due to gravity and to the opposite end of the tube 61, thereby resulting in a teetering action of housing 59 and shaft 58 and being of sufficient impetus to impart a further turning movement to the housing 59 with the extent of this turning motion being limited by the opening or slot 60 arranged in the lower inner side of the housing 59 with the edge thereof abutting against the lever 57 so as to restrain the same from any further movement. This further movement of the housing 59 causes the cam-like portion 68 carried by the periphery of the housing 59 to contact the roller 67 arranged on the lower end of the lever arms 66, thereby causing the shaft 64 to rotate so that the cam-like member 65 carried thereby will actuate the limit switch 35 merely instantaneous to close the same.

The closing of the switch 35 energizes the solenoid 27 which, in turn, draws the armature portion or piston 26 into the solenoid rotating the rocking member 25 about the shaft 22. As the rocking arm 25 rotates, the pin 29 carried thereby engages with and causes the segmental gear 23 also to rotate in the same direction so as to position it against the stop 31, as shown in Figure 6, thereby rotating the gear 24 with which it is meshed and the cam shaft 8 to which the gear 24 is attached and the cam 9 so as to position the flange or stop 11 carried by the cam against the cam follower 14, thus permitting the plunger 12 together with the anvil 13 carried thereby to move upwardly due to the action of the loaded spring 15 to its retracted or normal position and at the same time loading the helical spring 20. When the cam shaft 8 has assumed this position, the notch or shoulder 17 of the annular member 16 carried by the shaft will again become engaged with the trigger or latch member 21 carried by the plunger 38 so as to lock the shaft together with the cam in their initial or normal positions with the two anvils spaced apart ready to gauge the next sheet of material. At this time the switch 35 is open and the solenoid 27 deenergized. The rocking arm 25 then drops back to its normal position against the stop 30 due to its weighted bottom portion 28 which acts as a counterbalance therefor.

After the lever arm 57 has reached its most rearward position and the thickness of the sheet has been noted on the indicating dial, the same is removed from the gauge and the helical torsion spring 54 which has been loaded tends to force the sheet out of the gauge and causes the housing 53, together with the lever arm 57 carried thereby, to move in a reverse or outward direction until the arm 57 reaches its most forward position. The arm 57 which is in abutting engagement with the edge of the slot 60 also rotates the housing 59 in a reverse direction, thereby returning the housing 59 together with the tube-like container 61 to their initial positions, whereby the balancing medium in the tube shifts to the opposite end thereof. It will be seen that the arm 57 also rotates the fork or U-shaped member 47 in a reverse direction with the pawl 48 sliding freely over the indentations or teeth 49 carried by the ratchet 44.

As a result of my invention it will be seen that there is provided a gauge which is controlled by the material to be gauged having means incorporated therewith for automatically resetting the gauge without any attention from the operator after each gauging operation in readiness for the next gauging operation.

While I have shown and described a specific embodiment of my invention, it will be understood that this embodiment is merely for the purpose of illustration and description, and that various other forms may be devised within the scope of my invention, as defined in the appended claims.

I claim:

1. A gauge for determining the thickness of material comprising an indicating dial, a shaft associated with said dial, means carried by said shaft cooperating with said dial to indicate thereon the thickness of the material, a stationary anvil, a movable anvil oppositely disposed from said stationary anvil, means carried by said shaft for actuating said movable anvil, resilient means which is normally loaded for rotating said shaft in one direction, means associated with said shaft for positioning and preventing the same from rotating when the anvil is in a retracted position away from said stationary anvil, means for releasing said shaft so that the same will be rotated due to the action of said resilient means whereby the movable anvil is forced outwardly toward the stationary anvil and against the surface of the material to be gauged, means with which the material engages when positioned in said gauge for actuating said releasing means, and automatic means responsive to the movement of said last mentioned means for actuating means for rotating said shaft in the opposite direction against the action of said resilient means thereby loading the same after the material has been gauged so that the movable anvil will be moved to its retracted position away from said stationary anvil and the material being gauged and be reset for the next gauging operation.

2. A gauge of the combination as defined in claim 1 wherein the means associated with the shaft for positioning and preventing the same from rotating when the anvil is in a retracted position comprises a notched member securely arranged on said shaft, a pawl-like latch member arranged directly opposite said notched member which is adapted to cooperate therewith, resilient means associated with said pawl-like latch member for normally retaining the same in engagement with the notched member, and means for moving said pawl-like latch member out of engagement with said notched member against the action of said resilient means thereby permitting the shaft to rotate whereby the movable anvil is moved outwardly toward the stationary anvil and against the material to be gauged, said means with which the material engages when positioned in said gauge adapted to actuate said last mentioned means.

3. A gauge of the combination as defined in claim 1 wherein the means associated with the shaft for positioning and preventing the same from rotating when the anvil is in a retracted position comprises a notched member securely arranged on said shaft, a plunger-like member arranged opposite said annular member, a pawl-like latch member arranged on the end of said plunger-like member directly opposite said notched member and which is adapted to cooperate with the notch therein, resilient means associated with said plunger-like member for normally retaining the pawl-like latch member in engagement with said notched member, and means for moving said plunger-like member away from said notched member against the action of said resilient means so that the pawl-like latch member carried thereby is disengaged from the annular member thereby permitting the shaft to rotate whereby the movable anvil is moved outwardly toward the stationary anvil and against the material to be gauged, said means with which the material engages when positioned in said gauge adapted to actuate said last mentioned means.

4. A gauge of the combination as defined in claim 1, wherein the automatic means responsive to the movement of the releasing means for actuating means for rotating the shaft to reset the same for the next gauging operation comprises a pinion gear arranged on the shaft, a gear segment independently mounted with which said gear is adapted to cooperate, a solenoid having a plunger arranged therewith, said solenoid plunger adapted to actuate said gear segment so as to rotate said shaft together with the cam carried thereby to move the same so that said movable anvil is in its retracted position, a switch for controlling the energization of said solenoid and the movement of said plunger, a member rotatably mounted for limited oscillating movement, an outwardly extending arm-like member carried by said rotatable member with which the material to be gauged is adapted to cooperate when positioned in the gauge, a resilient means arranged with said rotatable member for rotating the same in one direction so that the arm-like member carried thereby will normally be maintained in its most forward position in the gauge, said material to be gauged adapted to move said arm-like member rearwardly from its forward position so as to rotate said rotatable member against the action of the resilient means carried thereby so as to load the same, and simultaneously actuating means for permitting said shaft to rotate whereby the movable anvil is moved outwardly toward the stationary anvil and against the material to be gauged, and means responsive to the movement of said oscillatory member for actuating said switch so as to actuate said solenoid plunger whereby the same rotates said shaft in the opposite direction against the action of the resilient means arranged therewith thereby loading the same after the material has been gauged so that the movable anvil will be moved to its retracted position, away from the stationary anvil and the material being gauged.

5. A gauge of the combination as defined in claim 1, wherein the automatic means responsive to the movement of the releasing means for actuating means for rotating the shaft in the opposite direction to reset the same for the next gauging operation comprises a pinion gear arranged on the shaft, a gear segment with which said gear is adapted to cooperate, a solenoid having a plunger arranged therewith, said solenoid plunger adapted to actuate said gear segment so as to rotate said shaft together with the cam carried thereby to move the same so that said movable anvil is in its retracted position, a switch for controlling the energization of said solenoid and the movement of said plunger, a member rotatably mounted for limited oscillating movement, an outwardly extending arm-like member carried by said rotatable member with which the material to be gauged is adapted to cooperate when positioned in the gauge, a resilient means arranged with said rotatable member for rotating the same in one direction so that the arm-like member carried thereby will normally be maintained in its most forward position in the gauge, said material to be gauged adapted to move said arm-like member rearwardly so as to rotate said oscillating member against the action of the resilient means carried thereby so as to load the same and simultaneously actuating means for permitting said shaft to rotate whereby the movable anvil is moved outwardly toward the stationary anvil and against the material to be gauged, a casing member arranged for limited oscillating movement with said rotatable member, a longitudinally extending tubular container carried by said casing member having a material loosely disposed therein for movement from one end of the same to the other, said container being supported substantially centrally intermediate the length thereof on said casing, and adapted to be moved by said oscillating member so that the material therein shifts from one end to the other due to gravity when the oscillating member together with the casing is moved from one position to another so as to further move said casing, and means carried by said casing which is adapted to actuate said switch when the same is moved by the shifting of the material in said container so as to actuate said solenoid plunger whereby the same rotates said shaft in the opposite direction against the action of the resilient means arranged therewith thereby loading the same after the material has been gauged so that the movable anvil will be moved to its retracted position away from the stationary anvil and the material being gauged, said loaded resilient means arranged with said oscillating member adapted to move the same together with the casing to its initial position so that said arm-like member is again in its forward position.

6. A gauge for determining the thickness of material comprising an indicating dial, a shaft associated with said dial, means carried by said shaft cooperating with said dial to indicate thereon the thickness of the material, a stationary anvil, a movable anvil oppositely disposed from said stationary anvil, means carried by said shaft for actuating said movable anvil, resilient means which is normally loaded for rotating said shaft in one direction, a notched member securely arranged on said shaft, a pawl-like latch member arranged directly opposite said notched member which is adapted to cooperate therewith, resilient means associated with said pawl-like latch member for normally retaining the same in engagement with the notched member, means for moving said pawl-like latch member out of engagement with said notched member, a member rotatably mounted for limited oscillating movement, an outwardly extending arm-like member carried by said rotatable member with which the material to be gauged is adapted to cooperate when positioned in the gauge, a resilient means arranged with said rotatable member for rotating the same in one direction so that the arm-like member carried thereby will normally be maintained in its most forward position, said material to be gauged adapted to move said arm-like member rearwardly from its forward position so as to rotate said rotatable member against the action of the resilient means carried thereby so as to load the same and to simultaneously actuate said pawl-like latch moving means so as to move the same out of engagement with the notched member against the action of the resilient means arranged therewith thereby permitting the shaft to rotate whereby the movable anvil is moved outwardly toward the stationary anvil and against the material to be gauged, and means responsive to the movement of said rotatable member for rotating the shaft in the opposite direction against the action of the resilient means arranged therewith thereby loading the same after the material has been gauged so that the movable anvil will be moved to its retracted position away from the stationary anvil and the material being gauged and be reset for the next gauging operation.

DARIO BUCCICONE.